(12) United States Patent
Matsumoto et al.

(10) Patent No.: US 6,256,162 B1
(45) Date of Patent: Jul. 3, 2001

(54) MOVING PICTURE SEARCHING APPARATUS

(75) Inventors: Akihiko Matsumoto; Kuniharu Onozuka, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/737,971

(22) PCT Filed: Mar. 29, 1996

(86) PCT No.: PCT/JP96/00852

§ 371 Date: Apr. 18, 1997

§ 102(e) Date: Apr. 18, 1997

(87) PCT Pub. No.: WO96/30909

PCT Pub. Date: Oct. 3, 1996

(30) Foreign Application Priority Data

Mar. 31, 1995 (JP) .................................................. 7-100652

(51) Int. Cl.⁷ .................................................. G11B 15/18
(52) U.S. Cl. .......................................................... 360/72.2
(58) Field of Search .............................. 360/72.2, 72.1, 360/71; 386/68–70, 81, 82

(56) References Cited

U.S. PATENT DOCUMENTS

| | | | |
|---|---|---|---|
| 4,802,019 | * | 1/1989 | Harada et al. .................. 360/72.2 X |
| 5,105,401 | * | 4/1992 | Aoyagi et al. .................. 360/72.2 X |
| 5,157,511 | * | 10/1992 | Kawai et al. .......................... 386/68 |
| 5,177,513 | * | 1/1993 | Saito ................................... 352/129 |
| 5,365,384 | * | 11/1994 | Choi ................................... 360/72.2 |
| 5,384,674 | * | 1/1995 | Nishida et al. ..................... 360/72.2 |
| 5,485,611 | * | 1/1996 | Astle ................................... 360/72.2 |
| 5,604,512 | * | 2/1997 | Okamoto et al. ................... 386/68 X |
| 5,864,646 | * | 1/1999 | Searby ............................... 386/82 X |

FOREIGN PATENT DOCUMENTS

| | | |
|---|---|---|
| 0 425 168 A2 | 5/1991 | (EP) . |
| 61-229290 | 10/1986 | (JP) . |
| 2-101691 | 4/1990 | (JP) . |
| 3-134883 | 6/1991 | (JP) . |
| 4-258845 | 9/1992 | (JP) . |

* cited by examiner

*Primary Examiner*—Paul Loomis
*Assistant Examiner*—K. Wong
(74) *Attorney, Agent, or Firm*—Frommer Lawrence & Haug, LLP.; William S. Frommer; Joe H. Shallenburger (57) ABSTRACT

The present invention relates to a moving picture searching apparatus, where moving picture information recorded can be searched easily when desired moving picture information is picked out. Of single or plural moving picture(s) S2 recorded in predetermined recording medium, moving picture information which meets the condition designated by a user and obtained based on output S1 of input means 2 are searched based on respective index information which has been recorded in the recording medium 6 with respective corresponding moving picture information. On the other hand, after this, when it is confirmed on the basis of the output S1 of the input means that the user designated first operation mode, respective moving picture information S2 picked out by the search are sequentially reproduced at a predetermined timing and displayed on display means 4. Therefore, the user can look and confirm the contents of respective moving picture signals S2 which have the condition designated by the user as an index information, without complicated operation.

13 Claims, 7 Drawing Sheets

| |
|---|
| ID |
| TITLE |
| KEY WORD 1 |
| KEY WORD 2 |
| KEY WORD 3 |
| REGISTED DATE |
| MOVING PICTURE DATA ADDRESS 1 |
| MOVING PICTURE DATA ADDRESS 2 |
| MOVING PICTURE DATA ADDRESS 3 |
| ⋮ |
| MOVING PICTURE DATA ADDRESS N |

| No. | ID | TITLE | REGISTERED DATE |
|---|---|---|---|
| 1 | 1234 | ABCD | '94/9/12 |
| 2 | 2345 | BCDE | '94/2/2 |
| 3 | 3456 | CDEFGHI | '94/3/3 |
| 4 | 4567 | EFG | '94/4/4 |
| 5 | 5678 | GHIJK | '94/5/5 |
| 6 | 7890 | LMN | '94/6/15 |
| 7 | 1928 | XYZ | '94/9/30 |

BROWSE

FIG. 7

| No. | ID | TITLE | REGISTERED DATE |
|---|---|---|---|
| 1 | 1234 | ABCD | '94/9/12 |
| 2 | 2345 | BCDE | '94/2/2 |
| 3 | 3456 | CDEFGHI | '94/3/3 |
| 4 | 4567 | EFG | '94/4/4 |
| 5 | 5678 | GHIJK | '94/5/5 |
| 6 | 7890 | LMN | '94/6/15 |
| 7 | 1928 | XYZ | '94/9/30 |

BROWSE   NEXT

MOVING PICTURE SEARCHING APPARATUS

TECHNICAL FIELD

The present invention relates to a moving picture searching apparatus and, more particularly, is suitable for use in a moving picture library apparatus which can record control information (hereinafter, referred to as index information) in addition to the moving picture information when moving picture information to be recorded is recorded in a recording medium.

BACKGROUND ART

Heretofore, in a moving picture library apparatus, when moving picture information to be recorded is recorded in a recording medium, index information comprising of letter information such as a title, a keyword and a registered date can be recorded in addition to the moving picture information.

Therefore, in this type of the moving picture library apparatus, in the case of reproducing the moving picture information from the recording medium, desired moving picture information can be picked out on the basis of the index information easily.

Incidentally, in the aforementioned construction of the moving picture library apparatus, when the index information is made, a title or a keyword input with emphasis on a part of contents of the moving picture based on the moving picture information may cause a case where the contents of the moving picture which can be imagined from the index information is different from the contents of the actual moving picture. Therefore, there is a problem that it is difficult to confirm the contents of the moving picture by the index information.

Further, in this type of the moving picture library apparatus, in the case of picking out the desired moving picture information, the contents of the moving picture on the basis of the index information is confirmed mostly depending on the memory of an operator who has made the index information and recorded the moving picture information. Therefore, in the case where time has passed after recording the moving picture information, or the record number of the moving picture information has increased, there is a problem that it is difficult to confirm the contents of the moving picture by the index information.

Accordingly, in the case of picking out desired moving picture information, there is a necessity that the moving picture library apparatus searches the recorded moving picture information on the basis of the index information to confirm the contents of the moving picture by reproducing the searched moving picture information. Therefore, the operator must repeat the reproducing operation of the moving picture information as many as moving picture information picked out by search based on the index information, and this has a bad efficiency to search the recorded moving picture information rapidly and pick out the desired moving picture information.

DISCLOSURE OF THE INVENTION

The present invention has been made in view of the aforesaid conventional problems, and is intended to provide a moving picture searching apparatus which is able to easily search the recorded moving picture information when the desired moving picture information is picked out.

In order to solve the aforesaid problem, the present invention is provided with input means for inputting a predetermined condition by a user or for designating and inputting a predetermined first operation mode, display means, and searching means for searching moving picture information which meets the condition, designated by the user and obtained based on the output of the input means from single or plural moving picture information recorded in predetermined recording medium, on the basis of respective index information which have been recorded in the recording medium with respective corresponding moving picture information, on the other hand, for sequentially reproducing respective searched moving picture information at a predetermining timing when confirming the designation of first operation mode from the user on the basis of the output of the input means and displaying it on the display means.

Of single or plural moving picture information recorded in predetermined recording medium, moving picture information which meets condition, designated by a user and obtained based on the output of the input means are searched based on respective index information which have been recorded in the recording medium with respective corresponding moving picture information. On the other hand, after this, when it is confirmed on the basis of the output of the input means that the user designated first operation mode, respective moving picture information picked out by the search are sequentially reproduced at a predetermining timing and displayed on the display means, so that the user can look and confirm the contents of respective moving picture information, which have the condition designated by the user as an index information, without complicated operation.

BEST MODE FOR CARRYING OUT THE INVENTION

An embodiment of the present invention will hereinafter be described with reference to the drawings.

(1) First Embodiment

Figure 1:
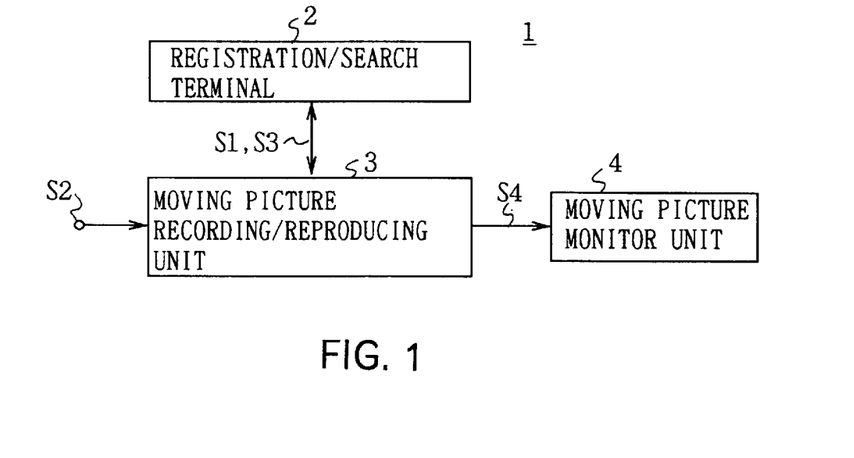
FIG. 1 is a block diagram showing the configuration of the first embodiment of the moving picture library apparatus according to the present invention.

In FIG. 1, numeral 1 shows a moving picture library apparatus as a whole, the apparatus is comprised of a registration/search terminal 2, a moving picture recording/reproducing unit 3, and a moving picture monitor 4.

The moving picture registration/search terminal 2 is comprised of a display and a keyboard, and outputs information, which is input by operating the keyboard by a user, to the moving picture recording/reproducing unit 3 as an input information signal S1.

On the moving picture recording operation, the moving picture recording/reproducing unit 3 records a moving picture signal S2 supplied to be recorded in a recording medium with index information, obtained on the basis of the input information signal S1, such as a title, a keyword, a registered date, and an ID input by the user.

Further, on the moving picture searching operation, when the moving picture recording/reproducing unit 3 obtains the keyword designated by the user (hereinafter, referred to as designated keyword) on the basis of the input information signal S1, the index information of a plurality of the moving picture signals S2 recorded in the recording medium are sequentially read out, thereby a moving picture signal, having the designated keyword as index information, is searched from a plurality of the moving picture signals S2 recorded in the recording medium, then the index information such as the title, the registered date and the ID of the searched moving picture signal S2 are output to the registration/search terminal 2 as a search result signal S3.

Thereby the moving picture recording/reproducing terminal 3 displays respective index information of the searched moving signals S2 on a display of the registration/search terminal 2.

Furthermore, after displaying, if the moving picture recording/reproducing unit 3 confirms based on the input information signal S1 that the user designated predetermined moving mode (hereinafter, referred to as browse moving mode), the beginning portion of the searched moving picture signals S2 are sequentially read out for each predetermined time designated beforehand, then the read moving picture signals S2 are sequentially output to the moving picture monitor 4 as reproduction moving picture signals S4 in order to sequentially display.

In this case, in the moving picture library apparatus 1, among a plurality of the moving picture signals S2, the moving picture based on the moving picture signal S2 corresponding to the keyword which is input by the user is sequentially displayed, thus the user can search desired moving picture speedily.

Figure 2:
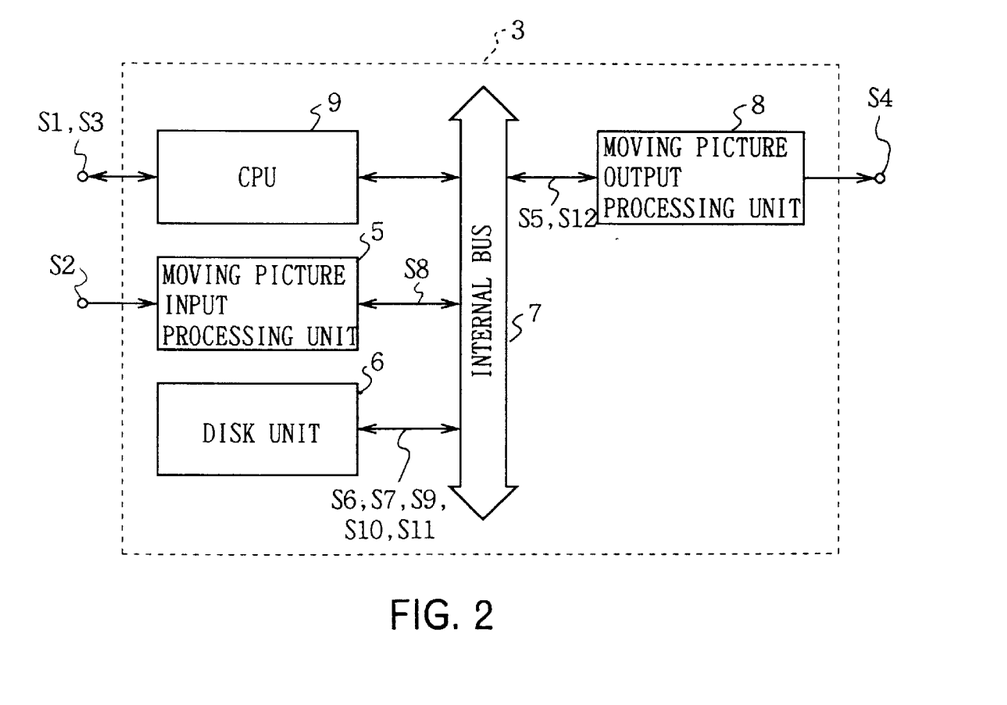
FIG. 2 is a block diagram showing the configuration of the first embodiment of the moving picture recording/reproducing unit.

As shown in FIG. 2, the moving picture recording/reproducing unit 3 is comprised of a moving picture input processing unit 5 for performing an analog-to-digital conversion and a data compression to the supplied moving picture signal S2, a disk unit 6 (for example, a hard disk) comprising a disk or a driving gear of the disk, an internal bus 7, a moving picture output processing unit 8 for performing an extension processing and a digital-to-analog conversion to the reproduction moving picture data S5 read out from the disk unit 6, and a CPU 9 for drive-controlling the moving picture input processing unit 5, the disk unit 6, and the moving picture output processing unit 8.

In this case, a buffer having a recording capacity for a predetermined first data unit (for example, sector unit of a disk) is provided in the moving picture input processing unit 5.

Figure 3:
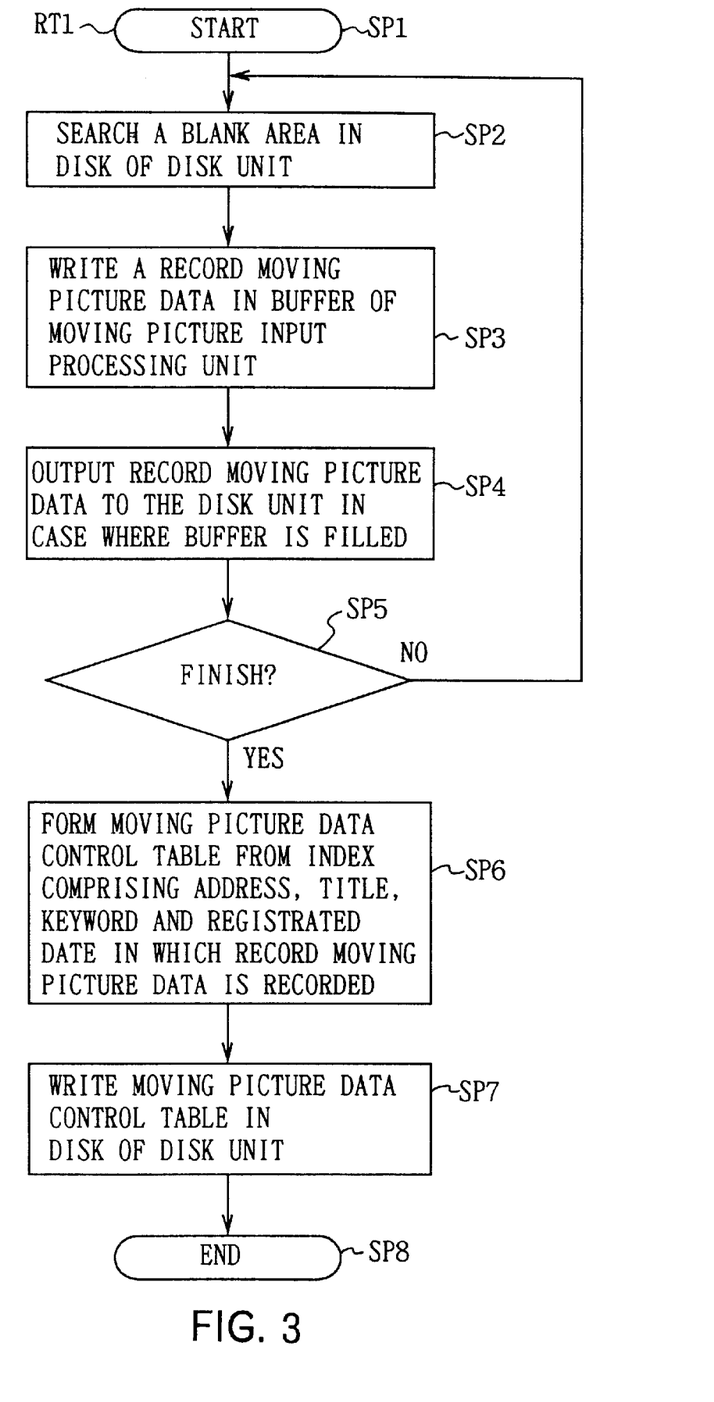
FIG. 3 is a flow chart showing the moving picture filing procedure of the moving picture library apparatus.

Further, on the moving picture recording operation, the CPU 9 drive-controls the moving picture input processing unit 5 and the disk unit 6 in accordance with a moving picture filing procedure RT1 shown in FIG. 3, thereby the moving picture signal S2 supplied is recorded in the disk of the disk unit 6 with index information. On the other hand, on the moving picture searching operation, the CPU 9 drive-controls the disk unit 6 and the moving picture output processing unit 8, in accordance with a moving picture searching procedure RT2 shown in FIG. 4, thereby a moving picture signal, having the designated keyword designated by the user as index information, is searched among the moving picture signal S2 recorded in the disk, then the beginning portion of each searched moving picture signal S2 is sequentially displayed on the moving picture monitor 4 if necessary.

In practice, on the moving picture recording operation, when the moving picture signal S2 is supplied to the moving picture input processing unit 5, the CPU 9 starts the moving picture filing procedure RT1 shown in FIG. 3, and proceeds from step SP1 to step SP2. In step SP2, a driving control signal S6 is output to the disk unit 6 through the internal bus 7 to drive the disk, thus a blank area in which the moving picture information for a first data can be recorded is searched in the disk.

At this time, the moving picture input processing unit 5 sequentially performs the analog-to-digital conversion and the data compression to the moving picture signal S2 supplied to form a record moving picture data S7. In sequential step SP3, the CPU 9 outputs a control signal S8 to the moving picture input processing unit 5 through the internal bus 7 to sequentially write the formed record moving picture data S7 in the buffer.

Next, the CPU 9 proceeds to sequential step SP4, the CPU 9 wait for the buffer of the moving picture input processing unit 5 to be filled at step SP4. Then, when the buffer is filled, the control signal S8 is output to the moving picture input processing unit 5 through the internal bus 7, thereby the record moving picture data S7 written in the buffer is sequentially output to the disk 6 through the internal bus 7. Also, at this time, the CPU 9 outputs a record controlling signal S9 to the disk unit 6 through the internal bus 7, thereby the record moving picture data S7 is record in the blank area which has been searched at step SP2.

Sequentially, the CPU 9 proceeds to step SP5, and judges whether the supplied moving picture signal S2 has recorded in the disk unit 6 entirely or not. If a negative result is obtained, the CPU 9 returns to step SP2, and repeats a loop of steps SP5-SP2-SP3-SP4-SP5 until an affirmative result is obtained (that is, until all of the string of the supplied moving picture signal S2 are finished recording in the disk of the disk unit 6).

Figure 5:
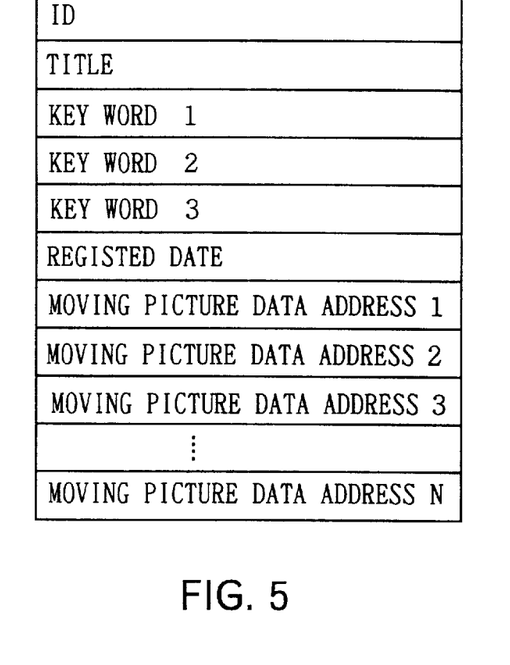
FIG. 5 is a schematic diagram showing a moving picture data control table made at the time of the moving picture recording operation.

After a while, when an affirmative result is obtained at step SP5, the CPU 9 proceeds to step SP6, and forms an index information comprising ID information, title information, keyword information, and registered date information of the moving picture signal S2, input by a user, obtained based on the input information signal S1 supplied from registration/search terminal 2, and forms a moving picture data control table such as shown in FIG. 5 according to address information of the recorded moving picture data S6 recorded in the disk in first data unit.

Sequentially, the CPU 9 proceeds to step SP7, and records the moving picture data control table in a predetermined area by outputting the moving picture data control table and record controlling signal S9 through the internal bus 7.

Further, after recording, the CPU 9 proceeds to step SP8, and the moving picture filing procedure RT1 is finished, so that the moving picture recording operation for the moving picture signal S2 is finished.

As shown in FIG. 5, in the moving picture data control table, each of the index information comprising the ID information, the title information, the keyword information, and the registered date information, and the address information (for example, 1 to N pieces) recorded the record moving picture data S7 in the disk in first data unit is formed.

Figure 6:
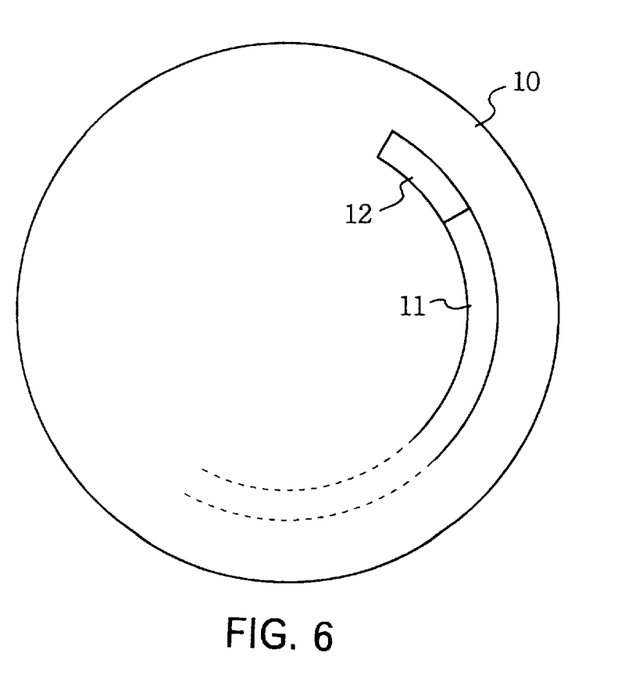
FIG. 6 is a schematic diagram showing each recording region of the disk.

Further, in the case of the embodiment, as shown in FIG. 6, the CPU 9 drive-controls the disk unit 6 so as to collectively record the recording moving picture data S7 based on a series of the moving picture signal S2 in the disk 10 of the disk unit 6 (for example, the series of the moving picture is collectively recorded in a sector 11 which is over "1000" in a sector unit or in a cluster unit collecting the sectors), thereby, the moving picture data control table of the moving picture signal S2 is recorded in a predetermined recording area of the disk 10, for example, is recorded in a sector 12 of "1" to "1000" in a sector unit or in a cluster unit. While, on the moving picture searching operation, when the CPU 9 obtains the input information signal S1 based on the designated keyword designated by the user from the registration/search terminal 2, the CPU 9 starts the moving picture searching procedure RT2 shown in FIG. 4, and proceeds from step SP9 to step SP 10. In step SP10, the search signal S10 based on the designated key word is output to the disk unit 6 through the internal unit 6 to drive the disk. Thereby, a plurality of the moving picture data control table recorded in the disk 10 sequentially read out to search the index information (hereinafter, referred to as moving picture data control table) of the moving picture data control table having the designated keyword based on the searching signal 10.

Figure 4:
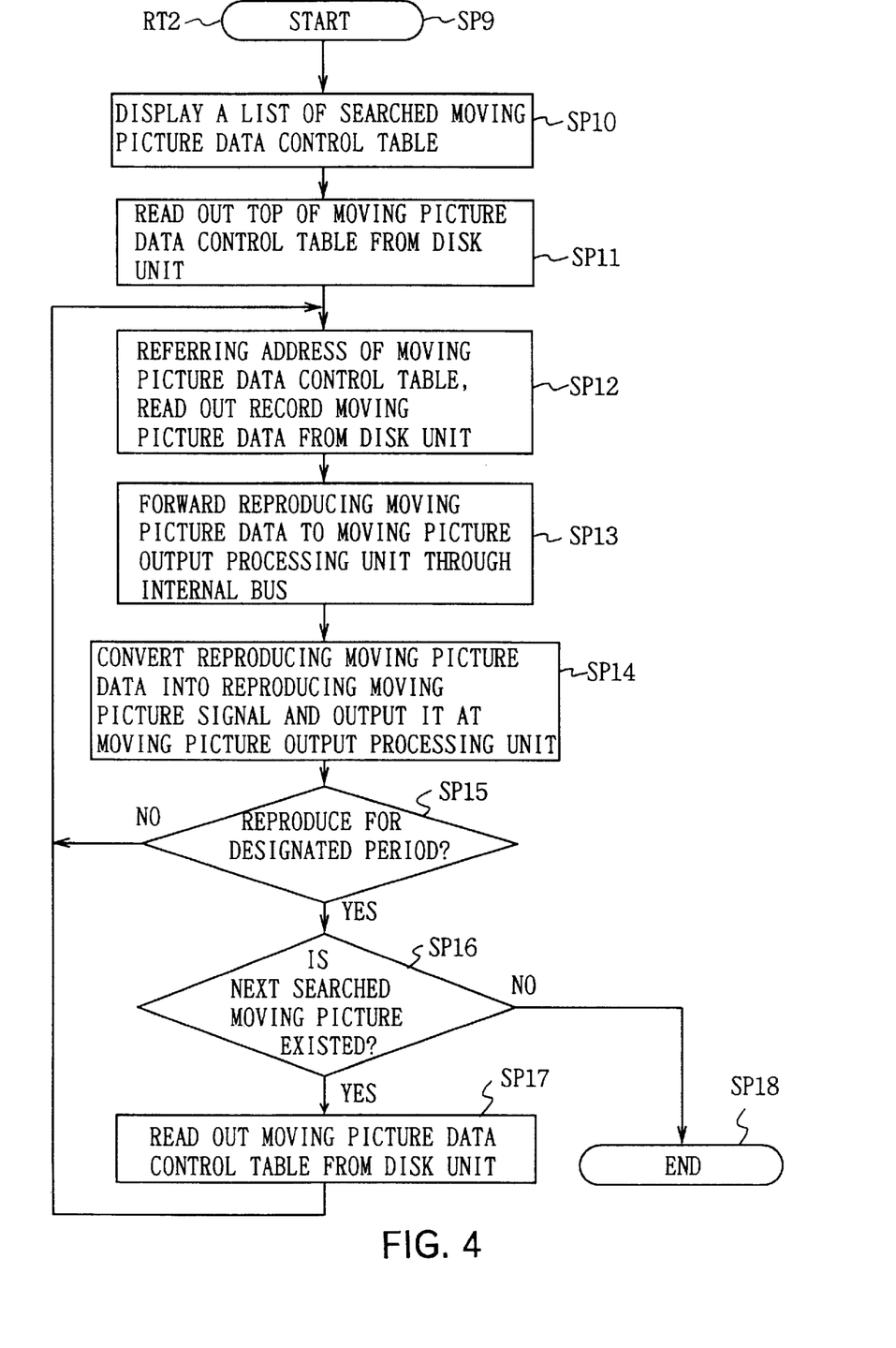
FIG. 4 is a flow chart showing the moving picture searching procedure according to the first embodiment.

Thus, the CPU 9 outputs the search result signal S3 based on the ID information, the title information, and the registered date information of the each searched moving picture data control table to the registration/search terminal 2 to display a list of the search result on the display screen of the display of the registration/search terminal 2.

Sequentially, when the CPU 9 confirms at step SP11 based on the input information signal S1 supplied from the registration/search terminal 2 that a user designates a browse operation mode, the control signal S11 is output to the disk unit 6 through the internal bus 7 to drive the disk, thus the first moving picture data control table of the list of the search result is read out.

Sequentially, the CPU 9 proceeds to step SP12, referring the first moving picture address information of the moving picture data control table, the CPU 9 outputs the controlling signal S11 to the disk unit 6 through the internal bus 7 to drive the disk, thus the record moving picture data S7 recorded in the first address based on the corresponding moving picture signal S2 is read out.

Sequentially, the CPU 9 proceeds to step SP13, and forwards the reproducing moving picture data S5 based on the reproduced moving picture signal S2 through the internal bus 7 by outputting the controlling signal S11 to the disk unit 6.

Sequentially, the CPU 9 proceeds to step SP14, and outputs a controlling signal S12 to the moving picture output processing unit 8 through the internal bus 7 to form the reproducing moving picture signal S4 by sequentially performing the data extension processing and the digital-to-analog conversion processing on the reproducing moving picture data S5. Also, the reproducing moving picture signal S4 is output to the moving picture monitor 4 to display the moving picture based on the reproducing moving picture signal S4 on the moving picture monitor 4.

Sequentially, the CPU 9 proceeds to step SP15, and judges whether the moving picture based on the reproducing moving picture signal S4 has been reproduced for the designated time set previously or not. If a negative result is obtained at step SP15, the CPU 9 returns to step SP12 and repeats a loop of steps SP15-SP12-SP13-SP14-SP15 until an affirmative result is obtained at step SP15 (that is, referring the moving picture address information after the second moving picture data control table sequentially, the record moving picture data S7 after the second record moving picture data based on the moving picture address information is sequentially read out in the same way and until the reproduction is completed for the designated time).

After a while, when an affirmative result is obtained at step SP15, the CPU 9 proceeds to step SP16, and judges whether the next moving picture data control table searched is existed or not, if an affirmative result is obtained, the CPU 9 proceeds to step SP17. At step SP17, the controlling signal S11 is output to the disk unit 6 through the internal bus 7 to drive the disk, thus the next moving picture data control table searched is read out.

Thus the CPU 9 repeats a loop of steps SP16-SP17-SP12-SP13-SP14-SP15-SP16 in the same way until a negative result is obtained at step SP16 (that is, until each moving picture signal S2, having the moving picture data control table searched, is all reproduced for designated time).

After a while, if an affirmative result is obtained at step SP16, the CPU 9 proceeds to step SP18, and finishes the moving picture searching procedure RT2. Thereby the moving picture searching operation is finished.

Figure 7:
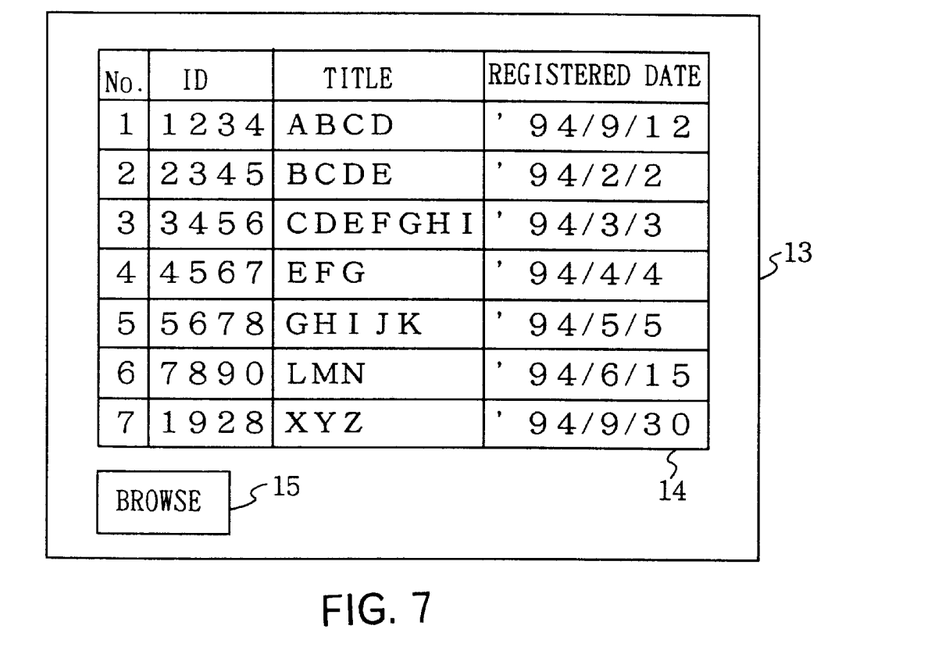
FIG. 7 is a schematic diagram showing the display screen of the registration/search terminal according to the first embodiment.

In the case of this embodiment, as shown in FIG. 7, the CPU 9 displays a list 14 of search result in which ID information, title information and registered date information of the moving picture data control table searched based on the designated keyword input on the display screen 13 are arranged sequentially on the display of the registration/search terminal 2. Further, the CPU displays an operation key 15 (hereinafter, referred to as browse 15) based on the browse operating mode for sequentially reproducing the moving picture signal S2 having the moving picture data control table displayed on the list 14 of the search result at every designated time designated arbitrary beforehand.

Further, the user places the top of the light pen on the browse 15 to instruct, so that the input information signal S1 based on the browse operating mode is supplied from the registration/search terminal 2. Thereby, the CPU 9 confirms that this browse mode is designated.

In the aforementioned configuration, in the moving picture library apparatus 1, when the moving picture input processing unit 5 receives the moving picture signal S2 on the moving picture recording operation, the CPU 9 searches the blank area for recording the moving picture signal S2 in the disk of the disk unit 6 (step SP1 to step SP2), and records the moving picture signal S2 in the disk of the disk unit 6 (step SP3 to step SP5). Sequentially, the CPU 9 makes a moving picture data control table with an address of the moving picture data recorded in the disk of the disk unit 6 and an index information based on the moving picture signal S2 input by the user from the registration/search terminal 2 (step SP6), then the CPU 9 records the moving picture data control table in the predetermined region in the disk of the disk unit 6 through the internal bus 7 (step SP7).

Further, when the moving picture library apparatus 1 receives the keyword designated by the user, the CPU 9 searches the moving picture control table of the moving picture signal S2 recorded in the disk of the disk unit 6 on the basis of the designated keyword, supplied from the registration/search terminal 2 on the moving picture searching operation, and displays the list of the search result 14 of the moving picture data control table having the designated keyword on the display screen 13 of the display of the registration/search terminal 2 (step SP9 to step SP10). After this, if the user designates the browse operation mode, the CPU 9 reads out the first moving picture data control table of the list of the search result recorded in the disk of the disk unit 6 on the basis of the browse operation mode supplied from the registration/search terminal 2 (step SP11), and refers the address information of the moving picture data control table, thereby the moving picture signal S2 recorded in the address is read out and the moving picture based on the moving picture signal S2 is displayed on the moving picture monitor 4 (step SP12 to step SP14). Thus, after the CPU 9 reproduces the moving picture based on the moving picture signal S2 having the first moving picture data control table for the designated period (step SP15), the moving picture based on the moving picture signal S2 having the rest of the moving picture data control table displayed on the list 14 of the search result is sequentially reproduced for the designated time by repeating the same operation (step SP16 to step SP17).

Accordingly, in the moving picture library apparatus 1, when the browse operation mode is designated for the moving picture, searched by the search, on the moving picture searching operation, the moving pictures are sequentially reproduced for the designated time, so that it is not necessary for the user to perform the reproducing operation at every moving picture signals S2. Thus the operational efficiency of the user is improved in the case of executing the moving picture searching operation.

According to the aforesaid configuration, in the moving picture library apparatus 1, a moving picture searched by the search on the based of a designated keyword on the moving picture searching operation is sequentially reproduced for designated time if necessary, thereby the user can look and confirm contents of the moving picture signal S2, having the designated keyword as the index information, without complicated operation. Thus in the case of picking out desired moving picture signal, a moving picture library apparatus which can search recorded moving picture signal easily can be realized.

(2) Second Embodiment

Figure 8:
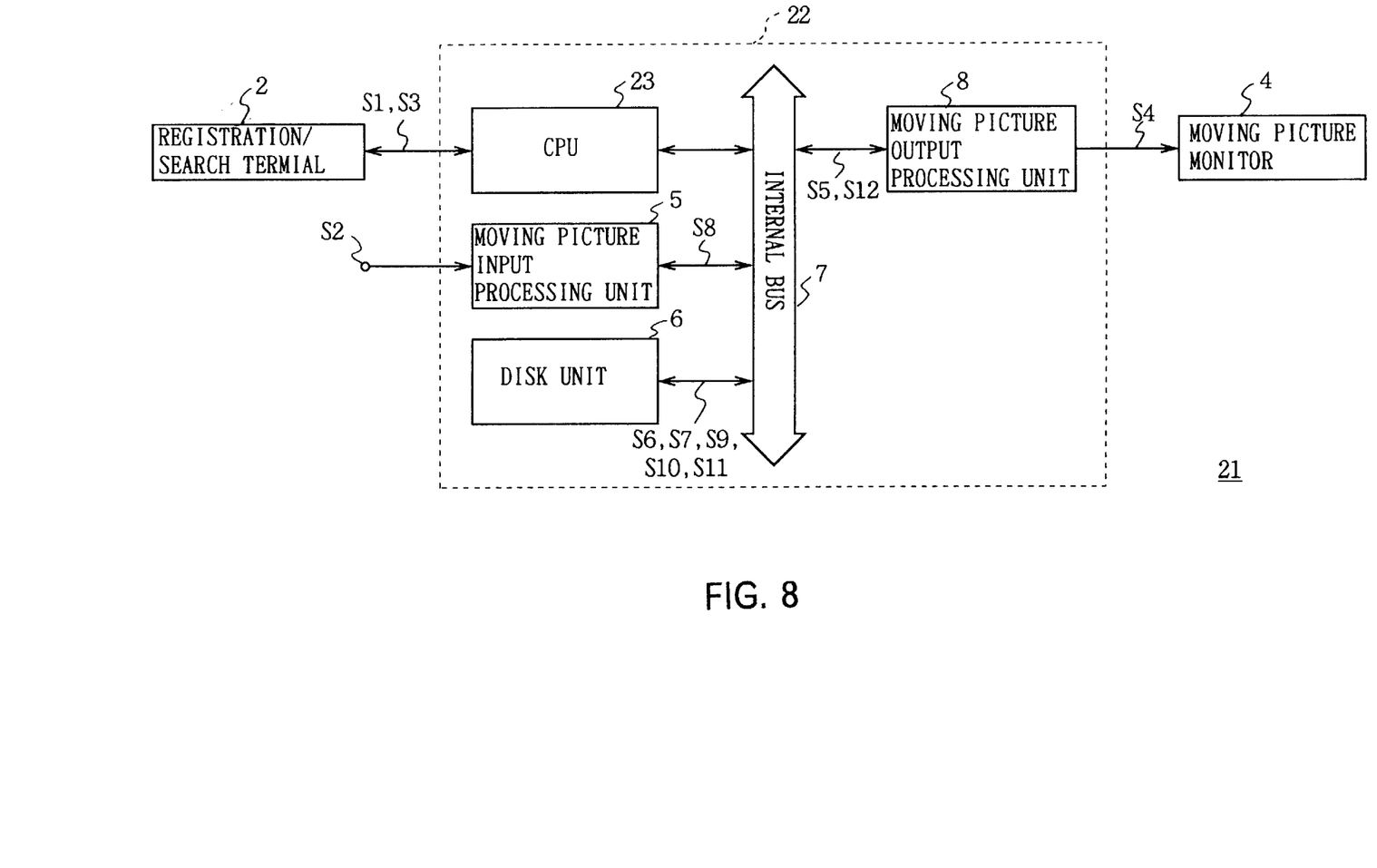
FIG. 8 is a block diagram showing the configuration of the second embodiment of the moving picture library apparatus according to the present invention.

FIG. 8, where the same reference numerals are applied to parts corresponding to FIG. 1 and FIG. 2, shows a moving picture library apparatus 21 according to a second embodiment and is constructed in the same way as the moving picture library apparatus 1 according to the first embodiment except for the construction of the CPU 9.

Figure 9:
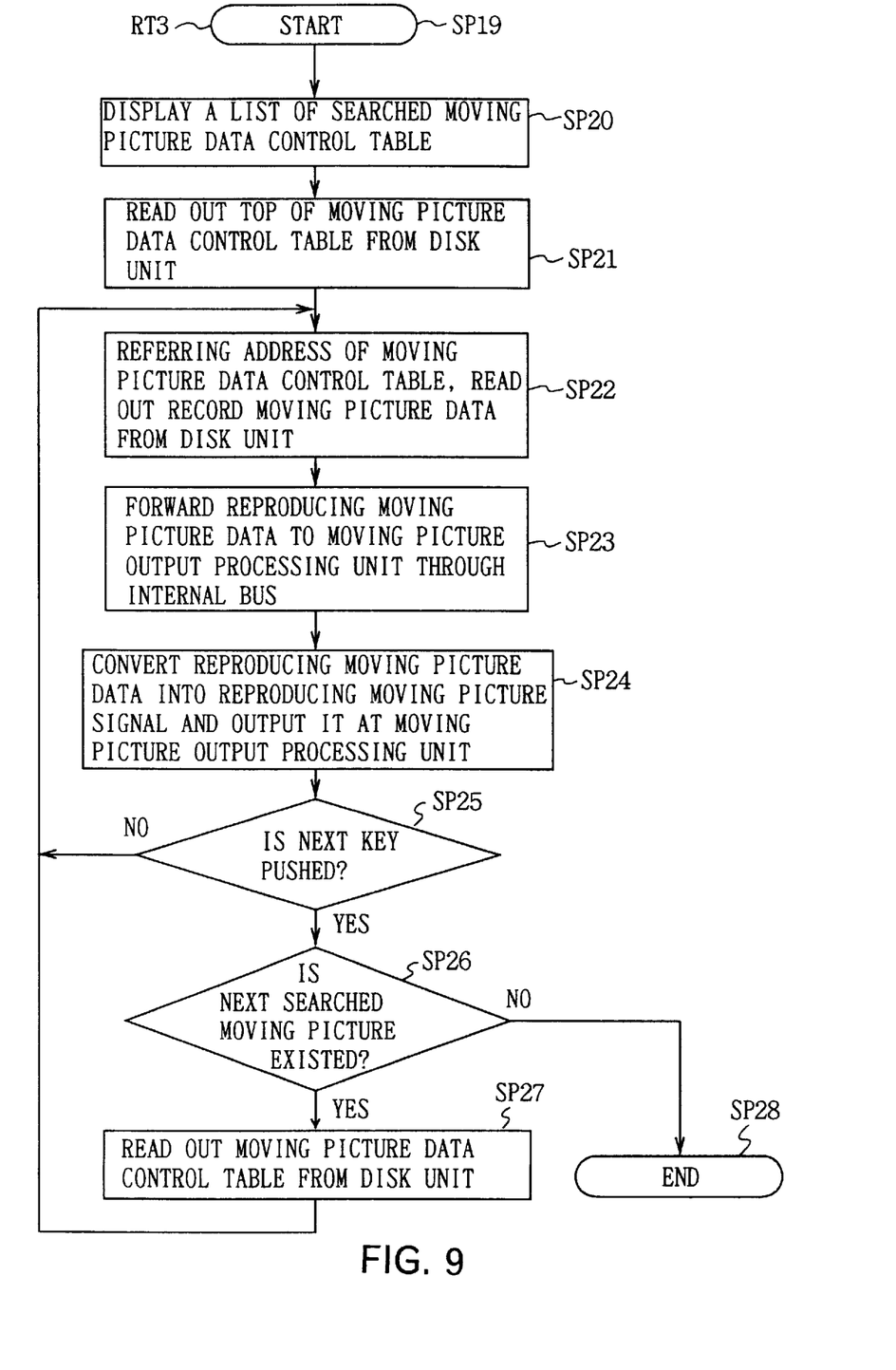
FIG. 9 is a flow chart showing a moving picture searching procedure according to the second embodiment.
Figure 10:
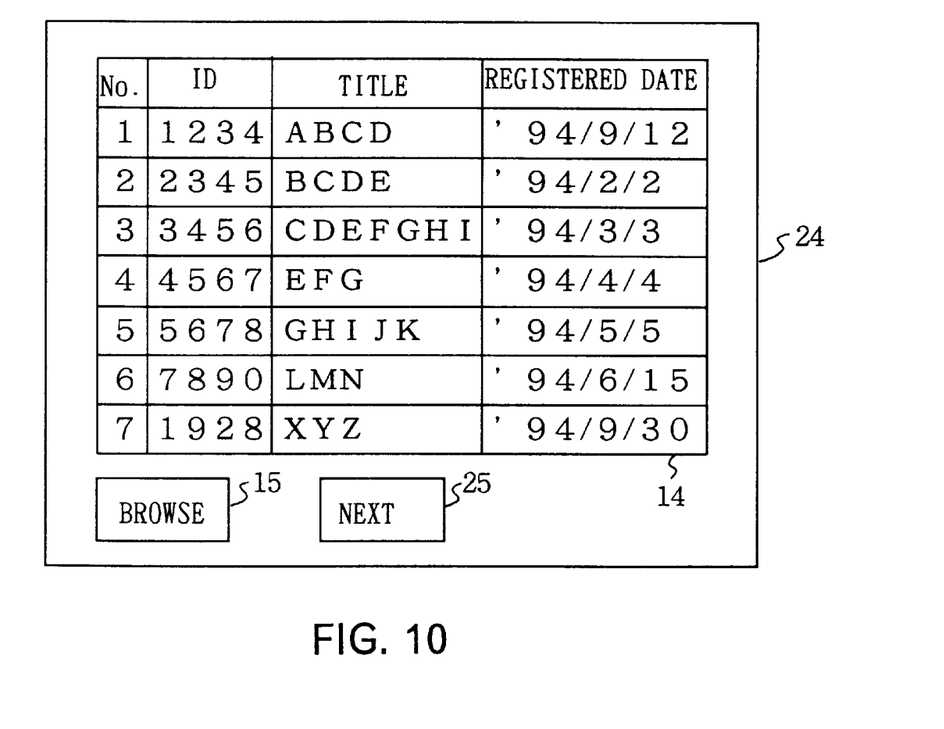
FIG. 10 is a schematic diagram showing the display screen of the registration/search terminal according to the second embodiment.

That is, in the case of the moving picture library apparatus 21, when a designated keyword is supplied as an input information signal SI from the registration/search terminal 2 on the moving picture searching operation, according to a moving picture searching procedure RT3 shown in FIG. 9, the CPU 23 of the moving picture recording/reproducing unit 22 searches moving pictures, having the designated keyword as index information, from the moving picture data control tables recorded in the disk of the disk unit 6 and displays the search result on the display of the registration/search terminal 2 as a list 14 of the search result shown in FIG. 10, in a similar to the moving picture library apparatus 1 (FIG. 1) of first embodiment.

After this, when the CPU 23 confirms that a user selected a browse operating mode to the input information signal S1, the CPU 9 displays a moving picture based on the moving picture signal S2, having first moving picture data control table in the list 14 of the search result, out of respective searched moving picture data control tables on the moving picture monitor 4.

Further, on the browse operating mode, when the CPU 23 confirms that the user determines and instructs the position of a displayed operating key 25 (hereinafter, referred to as next key 25) based on a next key operating mode by a write pen while displaying the moving picture based on the moving picture signal S2 having the searched moving picture data control table on the moving picture monitor 4, the display of the moving picture based on the moving picture signal S2 is stopped, and the moving picture based on the moving picture signal S2, having second moving picture data control table in the list 14 of the search result, is displayed on the moving picture monitor 4. On the other hand, similarly after this, as the moving picture data control table searched is changed according to the instruction of the next key 25 in order, the moving picture based on the moving picture signal S2 having the moving picture data control tables are displayed on the moving picture monitor 4.

Thereby, in the moving picture library apparatus 21, the user can search desired moving pictures more speedily, thus the efficiency of the operation can be improved.

In actual, in the case of the moving picture library apparatus 21, when the CPU 23 confirms that a user inputs the designated keyword, on the basis of the input information signal S1 supplied from the registration/search terminal 2, on the moving picture searching operation, the moving picture searching procedure RT3 shown in FIG. 9 is started at step SP19 and steps from sequential step SP20 to step SP24 are processed in a similar to the process from step SP10 to step SP14 of the moving picture searching procedure RT2. Thereby the moving picture signal S2 having first moving picture data control table of the list 14 of the search result is displayed on the moving picture monitor 4.

The CPU 23 judges based on the input information signal S1 whether the next key was instructed at sequential step SP25 or not, if a negative result is obtained, the CPU returns to step SP22 and repeats a loop of steps SP25-SP22-SP23-SP24-SP25 until an affirmative result is obtained at step SP22 (until the CPU 23 confirms based on the input information signal S1 that the user instructed the next key 25).

After a while, when an affirmative result is obtained at step SP25, the CPU 23 proceeds to step SP26. Next, the CPU 23 judges whether moving picture data control tables searched by the search are existed or not, if an affirmative result is obtained, the CPU 23 proceeds to step SP27, and the controlling signal S11 is output to the disk unit 6 through the internal bus 7 at step SP27 to drive the disk, thus the moving picture data control table searched by the search next is read out.

Thus the CPU 23 repeats a loop of steps SP26-SP27-SP22-SP23-SP24-SP25-SP26 until a negative result is obtained at step SP26 (until all of the moving picture signals S2, having the moving picture data control table searched by the search, are read out).

After this, when a negative result is obtained at step SP26, the CPU 23 proceeds to step SP28 and finishes the moving picture searching procedure RT3, thus the moving picture searching operation is finished.

In the aforesaid configuration, in the moving picture library apparatus 21, if a user inputs a designated keyword on the moving picture searching operation, the CPU 23 searches respective moving picture signals S2 recorded in the disk of the disk unit 6 on the basis of the designated keyword supplied from the registration/search terminal 2 to search moving picture signals S2 having the designated keyword, and displays the search result as a list 14 of the search result shown in FIG. 10 on the display screen 24 of the display of the registration/search terminal 2 (step SP19 to step SP20).

After this, when the user designates the browse operating mode, the CPU 23 reads out the moving picture data control table of first moving picture signal S2 in the list 14 of the search result recorded in the disk of the disk unit 6, further as referring the address information of the moving picture data control table, the moving picture signal S2 is started to be read out (step SP22), then the moving picture based on the moving picture signal S2 is displayed on the moving picture monitor 4 (step SP23 to step SP24).

After this, when the user designates the next key operating mode (step SP25), the CPU 23 stops reading out the moving picture signal S2 to read out next moving picture data control table (step SP26 to step SP27), thus the moving picture based on the moving picture signal S2, having the moving picture data control tables searched by the search, is sequentially reproduced by repeating the operation in a similar way.

Therefore, the moving picture library apparatus 21 can solve such problems as contents of the reproduced moving picture can not be checked within the designated reproducing time or the reproducing time is left because contents of a moving picture can be checked easily, in the case of sequentially reproducing moving pictures in the designated time. Thus the user can check contents of moving picture certainly in the reproduction of the moving pictures on the moving picture searching operation.

According to the aforesaid configuration, after the reproduction of the moving pictures is started by designating the browse operation mode, the reproduction of a moving picture is stopped at desired timing to change it to the reproduction of next moving picture. Thereby next moving picture can be reproduced after checking contents of the moving picture searched by the search certainly, thus the moving picture library apparatus which can search easily and speedily in the case of picking out a desired moving picture from recorded moving pictures can be realized.

(3) Other Embodiments

While in the aforesaid embodiment, it has been described that predetermined conditions are input by a user or the registration/search terminal 2 is employed as input means for designation-inputting predetermined first operating mode, the present invention is not limited thereto and various input means can be employed.

Further, while in the aforesaid embodiment, the position determination of the browse 15 and the next key 25 set up on the display screens 13 and 24 of the registration/search terminal 2 is instructed by the write pen, the present invention is not limited thereto the positions can be instructed by a pointing device such as a mouse, a joy stick, or a track ball, also a switch for instructing the browse 15 or the next key 25 can be set up on a key board or the like.

Further, while in the aforesaid embodiment, a designated keyword is input as predetermined conditions input in the input means, the present invention is not limited thereto and various information based on contents of an index information such as an ID, a title or a registered date can be designated.

Further, while in the aforesaid embodiment, moving pictures are displayed using the moving picture monitor 4 as display means, the present invention is not limited thereto and the moving pictures can be displayed on the display of the registration/search terminal 2.

Further, while in the aforesaid embodiment, a hard disk is employed as a predetermined recording medium, the present invention is not only limited thereto and recording mediums of various forms, e.g., a disk-form recording medium, such as a magnetic disk or an optical disk, or a tape-form recording medium, e.g., a magnetic tape, can be employed.

Further, while in the aforesaid embodiment, a recorded moving picture data S6 and a moving picture data control table based on a moving picture signal S2 are recorded in the disk of the disk unit 6, the present invention is not limited thereto and the recorded moving picture data S6 and the moving picture data control table based on the moving picture signal S2 can be recorded in different disks or in a recording device such as nonvolatile memory.

Further, while in the aforesaid embodiment, the beginning portion of the recorded moving picture signal S2 on the moving picture reproduction of the moving picture searching operation is reproduced, the present invention is not limited thereto and various portions of the moving picture signal S2, for example, a portion (main portion of the moving picture) corresponding to the keyword of the index information, can be reproduced. That is, an address corresponding to the portion of the moving picture designated by a user is recorded in first moving picture data address of each moving picture data control table, then the portion of the moving picture data shown by the address can be reproduced on the browse operating mode.

Further, while in the aforesaid embodiment, when the user designates the designated keyword on the moving picture searching operation, the CPU 9 and 23 check it on the basis of the input information signal S1 supplied from the registration/search terminal 2, output the search signal S10 to the disk unit 6, and read out and search the moving picture data control table recorded in the disk of the disk unit 6, the present invention is not limited thereto and, for example, the CPU 9 and 23 can take in the moving picture data control table from the disk unit 6 by driving the moving picture library apparatuses 1 and 21. Thereby the CPU 9 and 23 does not need to access to the disk unit 6 when the user designates the designated key word, and searching time can be shortened because the CPU 9 and 23 can search it at the inside.

Further, while in the aforesaid second embodiment, after the moving picture signal S2 having respective searched moving picture data control table is started to be read out, the moving picture signal S2 having next moving picture data control table is read out when the next key 25 is instructed, the present invention is not limited thereto and the reproducing time designated by the browse operation mode beforehand, if the next key 25 is instructed within the designated period, the moving picture signal S2 having next moving picture data control table can be read out. On the contrary, if the next key 25 is not instructed within the designated period, the moving picture signal S2 having next moving picture data control table can be read out by the browse operation mode after reproducing for the designated period.

As described above, according to the present invention, of singular or plural moving picture information recorded in a predetermined recording medium, the moving picture information which meets the conditions designated by a user and obtained on the basis of the output of input means is searched corresponding to respective moving picture information on the basis of respective index information recorded in the recording medium with each moving picture information. On the other hand, after this, when it is confirmed based on the output of the input means that first operation mode is designated by the user, respective searched moving picture information are sequentially reproduced at a predetermined timing and displayed on display means. Thereby the user can check contents of respective moving picture information, having conditions designated by the user as index information, without complicated operation, thus the moving picture searching apparatus in which recorded moving picture information can be searched easily in the case of taking out desired moving picture information can be realized.

Industrial Applicability

The present invention can be applicable to means where a lot of moving pictures are stored as a moving picture library apparatus, and the moving pictures can be read out and utilized if necessary.

What is claimed is:

1. A moving picture reproducing apparatus for reproducing moving pictures stored in a storage medium, the apparatus comprising:

input means for inputting key word information for specifying some portion of said moving pictures and designated time information for indicating a reproducing period;

search means for searching said moving pictures having information commensurate with said key word information, in order to select a plurality of said moving pictures from all moving pictures stored in said storage medium;

means for specifying a reproduce portion of said plurality of said moving pictures in accordance with said designated time information; and means for reproducing said specified reproduce portion of each selected moving picture respectively, so that said specified reproduce portions of said plurality of selected moving pictures are sequentially and automatically reproduced from said storage medium.

2. The moving picture reproducing apparatus according to claim 1, wherein said search means sequentially reproduces said portion of moving picture from the beginning of moving picture.

3. The moving picture reproducing apparatus according to claim 1, wherein said search means sequentially reproduces said portion of said plurality of said moving pictures at a previously predetermined portion for said reproduce portion.

4. The moving picture reproducing apparatus according to claim 1, wherein, when said search means further determines that data indicating a designation of a next key operating mode is input by said input means while reproducing said plurality of said moving pictures, the particular moving picture which is being currently reproduced is interrupted and said search means reproduces the next moving picture indicated in said keyword information.

5. The moving picture reproducing apparatus according to claim 1, wherein said keyword information indexes the addresses on said recording medium where corresponding moving pictures are recorded.

6. The moving picture reproducing apparatus according to claim 1, wherein said search means displays said keyword information corresponding to said moving pictures when selection retrieval ends.

7. The moving picture reproducing apparatus according to claim 1, wherein said keyword information is displayed on a display unit which is different from a display unit where moving pictures based on the moving pictures searched by said search means are displayed.

8. The moving picture reproducing apparatus according to claim 1, wherein said keyword information is recorded in a recording medium which is different from a recording medium where the moving pictures are recorded.

9. The moving picture reproducing apparatus according to claim 1, wherein said search means records said keyword information and said moving pictures according to said data input by said input means sequentially in a blank area on the recording medium; wherein said search means sequentially reproduces said moving pictures according to said keyword information input by said input means and displays a portion of the reproduced pictures for said predetermined period.

10. The moving picture reproducing apparatus according to claim 9, wherein said means for reproducing displays said keyword information simultaneously with the displayed portion of said particular moving picture.

11. A method for reproducing moving pictures stored in a storage medium, comprising the steps of:

inputting key word information for specifying some portion of said moving pictures and designated time information for indicating a reproducing period;

searching for a plurality of moving pictures having information commensurate with said key word information, in order to select a plurality of moving pictures from an all moving pictures stored in said storage medium;

specifying a reproduce portion of said selected plurality of moving pictures in accordance with said designated time information; and reproducing said specified reproduce portion of selected moving picture respectively so that said plurality of specified reproduce portions of said plurality of selected moving pictures are sequentially and automatically reproduced from said storage medium.

12. The method for reproducing moving pictures according to claim 11, wherein when said search is finished, said keyword information corresponding to found respective moving pictures is displayed.

13. The method for reproducing moving pictures according to claim 11, wherein in said step of reproducing, when data indicating the designation of a next keyword is input, the reproduction of said plurality of moving pictures which is being currently reproduced is interrupted and the reproduction of said next moving picture is started.

* * * * *